2,841,752

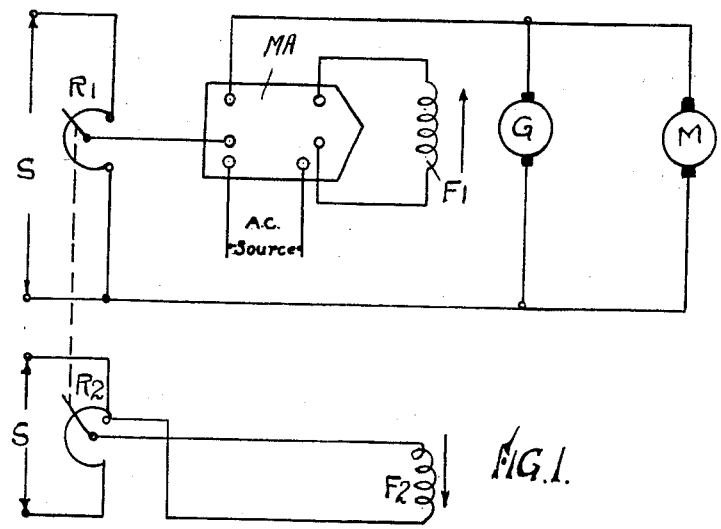
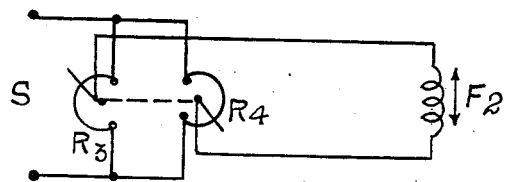

ELECTRIC CONTROL SYSTEMS PARTICULARLY SUITABLE FOR WARD-LEONARD DRIVES

Denis Bolton, Rugby, England, assignor to The British Thomson-Houston Company Limited, a British company Application October 23, 1953, Serial No. 387,862

Claims priority, application Great Britain October 30, 1952

4 Claims. (Cl. 318—145)

This invention relates to the excitation and control of electric generators and particularly, although not exclusively, to the control of the output voltage of direct current generators by control of their excitation.

Speed control of the motor of a Ward-Leonard drive is effected by controlling the voltage of the generator supplying the motor and this in turn is achieved by controlling the excitation of the generator. A convenient means for controlling the generator excitation would be by the use of a magnetic amplifier, the variable excitation current for the generator being obtained by rectifying the controlled A. C. output of the amplifier.

It is well known, however, that the output current of a magnetic amplifier cannot be reduced below a finite minimum value of about 10% of the rated current. It has been suggested to overcome this difficulty by providing the machine with a constant excitation of small value in bucking relation to the excitation provided by the magnetic amplifier, the bucking excitation being such as to be equal to the minimum excitation provided through the magnetic amplifier. This procedure, however, necessitated providing additional excitation through the amplifier of double that by the bucking excitation to enable a total excitation of equal value to that obtainable when the magnetic amplifier alone is employed. This also involves increasing the size of the generator with resulting increase in its cost.

It is the object of the invention to provide means for avoiding this difficulty.

According to the invention the bucking excitation is made variable and is varied simultaneously with the variation of the control of the magnetic amplifier in such a sense that, as the excitation provided through the magnetic amplifier is increased, the bucking excitation is reduced, whereby the bucking excitation is substantially zero when the main excitation provided by the magnetic amplifier is a maximum and is a maximum when the main excitation is a minimum.

In connection with an arrangement for controlling the speed of the D. C. motor of a Ward-Leonard set, it is often required to determine the voltage supplied by the generator to the motor (and thus the speed of the motor) by producing a voltage drop of predetermined value across a resistance, and comparing the predetermined voltage drop with the terminal voltage of the generator and causing the generator excitation to vary in dependence on any difference between the compared voltages in a sense such as to make the terminal voltage equal to the predetermined voltage drop. Thus, by changing the value of the predetermined voltage drop the generator voltage can be varied. In carrying out the invention, in connection with such an arrangement, we may cause a current proportional to the difference between the compared voltages to flow through the control winding of the magnetic amplifier, the output from which is used for energising a main exciting winding of the generator, provide an auxiliary winding energized from a source of voltage such a sense as to produce an excitation in opposing relation to that provided by the main exciting winding, and control the value of the voltage applied to the auxiliary winding simultaneously with the value of that of the predetermined voltage drop, so that, as the generator voltage is raised by increasing the excitation furnished by the main exciting winding, the voltage applied to the auxiliary winding is decreased. This effect may be obtained, for example, by using rheostats, one of which controls the predetermined voltage, and the other the voltage applied to the auxiliary winding, the rheostats being coupled together for simultaneous movement. The magnetic amplifier meanwhile serves to maintain the generator voltage at the value desired by the setting of the rheostat which controls the predetermined voltage drop.

If the auxiliary excitation is made to boost as well as buck the main excitation by providing means for reversing the voltage applied to the terminals of the auxiliary winding, a further improvement may be obtained and the size of the machine is not increased. The main excitation provided through the magnetic amplifier can then be made less than the maximum value required, since it is boosted by the effect of the auxiliary winding in the larger values of excitation, and bucked by the auxiliary winding in the lower values down to zero. The second rheostat which controls the excitation of the auxiliary winding is now arranged to reverse the polarity of the voltage applied to the auxiliary winding at a suitable point in the range of control.

The value of excitation supplied by the auxiliary winding may normally be of a value of approximately 10% of the total excitation required since this is a value below with the excitation supplied through the magnetic amplifier cannot be reduced. Where, however, the auxiliary winding is made to buck and boost it may supply excitation up to a maximum of, say, 25%, of the total excitation required.

The invention is illustrated in the accompanying drawings in which Fig. 1 shows an arrangement in which the auxiliary bucking excitation is controlled between maximum and minimum values; while Fig. 2 shows an alternative arrangement for the auxiliary excitation in which it is made to buck and to boost the main excitation.

Referring to the arrangement shown in Fig. 1, we have indicated the application of the invention to a Ward-Leonard system in which the speed control of a motor M is obtained by supplying it from a generator G, the excitation of which is controlled in order to vary the output voltage supplied to, and thus the speed of, the motor. The generator is provided with a main field winding $F_1$ which is excited from the controlled output of a magnetic amplifier MA. The output from the magnetic amplifier is controlled by supplying to its control winding a variable direct current which is obtained by balancing the terminal voltage of the generator G against the potential obtained from a constant voltage D. C. supply S through a rheostat $R_1$. The excitation furnished by winding $F_1$ is thus made to vary in accordance with any difference between the generator voltage and the fixed voltage obtained from source S so as to maintain the generator voltage constant at a value determined by the setting of rheostat $R_1$.

A constant direct voltage supply is also furnished through a second rheostat $R_2$ to an auxiliary field winding $F_2$ of the generator G. The auxiliary field produced by winding $F_2$ is in bucking relation with the field produced by winding $F_1$ and the moving arms of the rheostats $R_1$ and $R_2$ are coupled together by a mechanical linkage indicated by reference numeral C so that, as the main generator excitation is increased by variation of the rheostat $R_1$, the auxiliary excitation furnished by field winding $F_2$ is reduced. The excitation supplied by the field winding $F_1$ through the magnetic amplifier can not be reduced below about 10%, as above-mentioned, and the auxiliary bucking field produced by winding $F_2$ is arranged to provide a maximum excitation of a value of approximately 10% of that given by winding $F_1$ when the setting of rheostat $R_1$ is such as to provide the minimum main excitation, so that the total excitation of the generator is then reduced substantially to zero. As a result of the coupling together of the rheostats, when the excitation provided by winding $F_1$ is increased to a maximum, that provided by winding $F_2$ is reduced to a minimum so that there is then no bucking excitation present.

In the arrangment shown in Fig. 1, the winding $F_2$ produces no useful excitation and thus the generator needs to be made bigger than it would otherwise be in order to accommodate additional winding turns which are not always effectively employed. This disadvantage is removed by the arrangement shown in Fig. 2 where the excitation provided by the auxiliary field winding $F_2$ is made both to buck and to boost the excitation provided by winding $F_1$. Reference numeral $F_2$ of Figs. 1 and 2 indicate the auxiliary field winding utilized in conjunction with the main field winding $F_1$ shown in Fig. 1 and the energizing circuitry for auxiliary winding $F_2$ of Fig. 2 may be employed in place of corresponding circuitry of Fig. 1 in which case the mechanical connection indicated by C' in Fig. 2 will be connected to the arm of rheostat $R_1$ of Fig. 1 in order that rheostats $R_1$, $R_3$ and $R_4$ may be simultaneously actuated. This bucking and boosting is effected by connecting the winding $F_2$ to the auxiliary constant potential source S of direct voltage through two rheostats $R_3$, $R_4$ connected in reversed parallel with one another, the rheostats being controlled simultaneously so as to enable the direction of current flow through winding $F_2$ to be reversed. Rheostats $R_3$, $R_4$ are also ganged to rheostat $R_1$ so as to be actuated simultaneously with it, the operation being such that, in the position of the rheostat $R_1$ where a minimum excitation is furnished by main field winding $F_1$, the auxiliary field is in bucking relation with the main field; whereas in the position of rheostat $R_1$ for maximum main excitation, the auxiliary field from winding $F_2$ boosts the main field. The excitation furnished by the auxiliary field winding $F_2$ is thus usefully employed to assist the main field and thus the number of turns in the main field can be reduced resulting in economy of material.

What I claim as new and desire to secure by Letters Patent of the United States is:

1. A system for controlling the speed of a direct current motor supplied with current from a generator by controlling the terminal voltage of the generator, comprising a source of voltage for supplying excitation current to the generator, a direct current reference voltage, a magnetic amplifier for controlling the excitation current, said magnetic amplifier having a control winding energised in dependence on any difference between the terminal voltage of said generator and said reference voltage whereby to adjust the excitation of said generator to restore the terminal voltage to a predetermined value, means providing an auxiliary excitation for the generator in a sense to buck the main excitation controlled through said magnetic amplifier, and means for adjusting simultaneously the value of said auxiliary excitation and the value of the reference voltage in such a manner that the auxiliary excitation is zero when the main excitation is a maximum, and is a maximum when the main excitation is a minimum.

2. A system for controlling the speed of a direct current motor supplied with current from a generator by controlling the terminal voltage of the generator comprising a source of voltage for supplying excitation current to a main field winding of the generator, a direct current reference voltage, a magnetic amplifier for controlling the current supplied to said main field winding from said source, said magnetic amplifier having the control winding energised in dependence on the difference between the terminal voltage of said generator and said reference voltage whereby to adjust the impedance of said magnetic amplifier and change the excitation of said generator to restore its terminal voltage to a predetermined value an auxiliary field winding for said generator, a source of direct current for energising said auxiliary field winding in a sense to buck the excitation provided by said main field winding, a rheostat for adjusting the value of the excitation current supplied to said auxiliary field winding, and means for simultaneously adjusting said rheostat and the value of said reference voltage whereby the auxiliary current supplied to said auxiliary field winding is zero when the current supplied to the said main field winding is a maximum and is a maximum when the current supplied to said main field winding is a minimum.

3. A system for controlling the speed of a direct current motor as claimed in claim 2, in which the means for adjusting said reference voltage is a potentiometer and said potentiometer is ganged to said rheostat to enable the simultaneous adjustment of the reference voltage and the current supplied to said auxiliary field winding to be effected.

4. A system for controlling the speed of a direct current motor as claimed in claim 2, having means for effecting a reversal of the polarity of said source of direct current whereby the auxiliary excitation of said generator is arranged to boost as well as to buck the excitation provided by said main field winding, an auxiliary field winding for said generator, a source of direct current for energising said auxiliary field winding in a sense to buck the excitation provided by said main field winding, a rheostat for adjusting the value of the excitation current supplied to said auxiliary field winding, and means for simultaneously adjusting said rheostat and the value of said reference voltage whereby the auxiliary current supplied to said auxiliary field winding is zero when the current supplied to said main field winding is a maximum and is a maximum when the current supplied to said main field winding is a minimum.

References Cited in the file of this patent

UNITED STATES PATENTS

| 1,565,412 | Bouton | Dec. 15, 1925 |
| 1,884,902 | Spencer | Oct. 25, 1932 |
| 2,184,371 | Thompson | Dec. 26, 1939 |
| 2,426,035 | Lindbeck | Aug. 19, 1947 |
| 2,499,200 | Somerville | Feb. 28, 1950 |
| 2,519,339 | Avery | Aug. 22, 1950 |
| 2,600,308 | Lund et al. | June 10, 1952 |
| 2,665,402 | Clark | Jan. 5, 1954 |